United States Patent [19]

Murtland

[11] 4,081,730
[45] Mar. 28, 1978

[54] MULTIPLE FUNCTION GENERATOR FOR AIRCRAFT FLIGHT INSTRUMENTS

[75] Inventor: William H. Murtland, Phoenix, Ariz.

[73] Assignee: Sperry Rand Corporation, New York, N.Y.

[21] Appl. No.: 696,457

[22] Filed: Jun. 16, 1976

[51] Int. Cl.² .............................................. B64C 31/18
[52] U.S. Cl. ...................................... 318/584; 73/182
[58] Field of Search ..................... 73/178 R, 182, 181, 73/386, 387, 178 T; 318/584

[56] References Cited

U.S. PATENT DOCUMENTS

| 2,706,407 | 4/1955 | Hosford | 73/182 |
| 3,435,675 | 4/1969 | Knapp | 73/182 |
| 3,440,601 | 4/1969 | Knapp | 73/182 X |
| 3,453,883 | 7/1969 | Caggia | 73/182 |
| 3,465,583 | 9/1969 | Molis | 73/182 |
| 3,537,086 | 10/1970 | Anderson | 318/584 X |
| 3,686,936 | 8/1972 | Daudt, Jr. | 73/181 X |

Primary Examiner—B. Dobeck

Attorney, Agent, or Firm—Howard P. Terry; Albert B. Cooper

[57] ABSTRACT

A multiple function generator is described in the environment of an airspeed indicator for controlling the maximum allowable airspeed needle in accordance with a plurality of selectable functions of altitude and comprises a cam having a plurality of surface segments shaped in accordance with the functions positioning a cam follower coupled to the maximum allowable airspeed needle. A null-seeking electro-mechanical feedback servo mechanism having an altitude signal applied to its input synchro drives the cam, thereby positioning the needle in accordance with the function of altitude represented by the cam surface segment in contact with the follower. Means are included for altering the null index of the servo thereby selectively engaging the desired cam function surface segment with the cam follower in accordance with the function desired. A selection knob is coupled with the indexing means for selecting the function.

11 Claims, 6 Drawing Figures

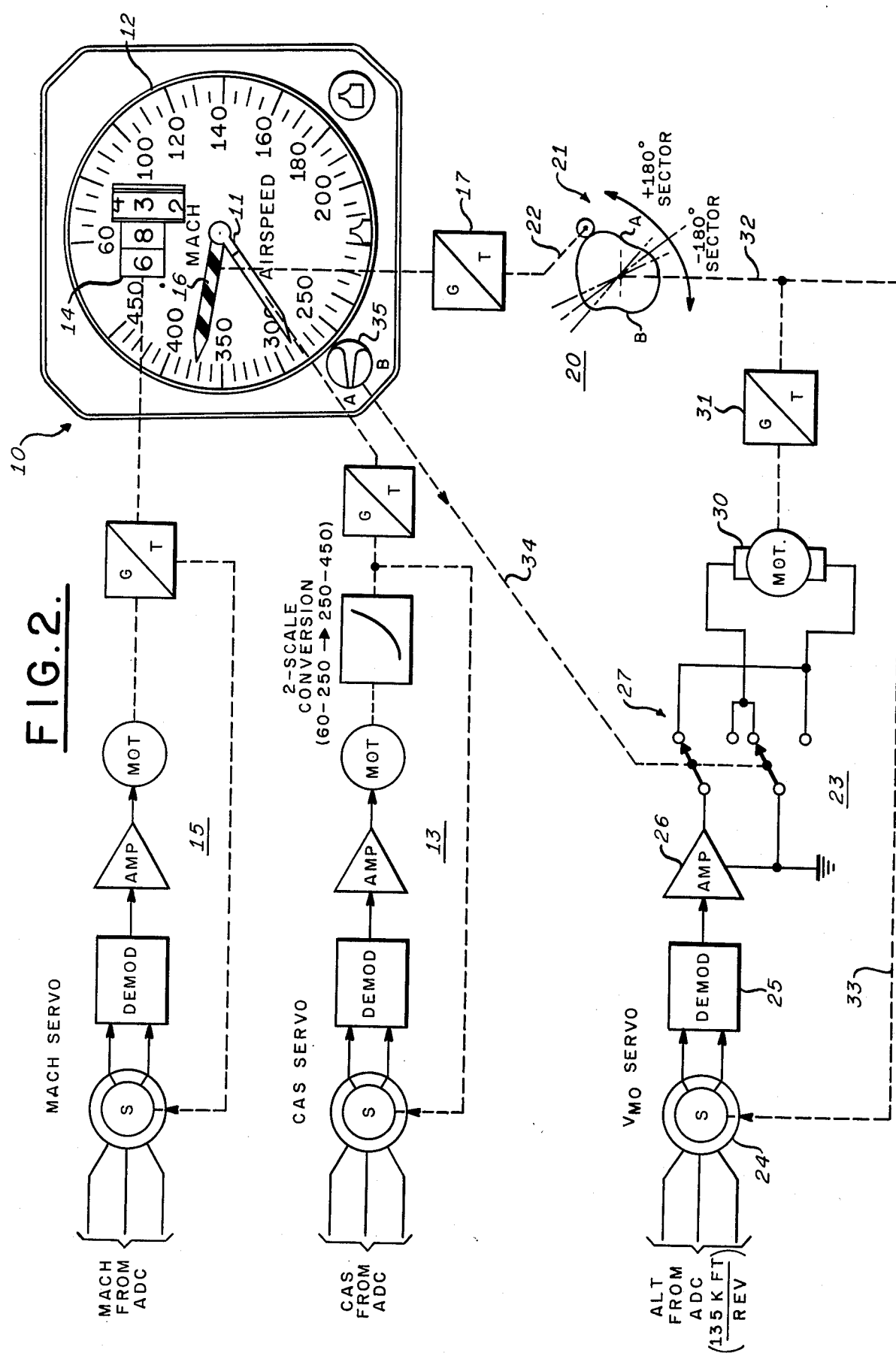

MULTIPLE FUNCTION GENERATOR FOR AIRCRAFT FLIGHT INSTRUMENTS

BACKGROUND OF THE INVENTION

1. Field of the Invention

The invention relates generally to multiple function generators for aircraft flight instruments and relates particularly to the maximum operating speed limit pointer driven as multiple and selectable functions of aircraft altitude.

2. Description of the Prior Art

Modern aircraft airspeed indicators often include a maximum operating speed limit pointer which functions to continuously advise the pilot of his maximum allowable airspeed. It is desirable that the indicator provide a plurality of selectable operational airspeed limits to satisfy the different operational requirements of a large number of users of the indicator. Generally, the manufacturers of aircraft instruments are required to provide a large number of customers operating a large number of different aircraft types under a wide variety of operating conditions with suitable instruments. Modern airspeed indicators used by most commercial airlines employ an actual airspeed pointer positioned by a closed-loop servo system in accordance with calibrated airspeed (CAS) received from the aircraft's air data computer, the pointer being read against an airspeed dial calibration. Such indicators normally include the warning pointer which indicates to the pilot the maximum airspeed the is permitted to fly under various flight conditions and aircraft configurations. Such limits are referred to as $V_{MO}$ or $M_{MO}$ (speed, maximum operating) in accordance with whether airspeed or mach number is the significant parameter. This maximum operating speed is typically a predetermined mach number (M) and/or equivalent airspeed (EAS). At higher altitudes, the limit is usually based on mach number while at lower altitudes, the limit is often based on equivalent airpseed. Both of these limits are functions of altitude so that the maximum operating speed pointer must be driven or positioned as a function thereof. However, each airframe manufacturer, airline operator or national regulatory agency may establish for the type of aircraft in question varying limit requirements whereby it is necessary that the instrument maufacturer be able to satisfy such requirements by relatively simple instrument modifications.

It is known that the mach number limit and the equivalent airspeed limit are non-linear functions of calibrated airspeed and altitude. While some prior art airspeed indicators provide multiple function mach number and equivalent airspeed limits, the mechanisms for providing such limits were not precision functions but were typically approximations of the actual non-linear functions, such approximations being achieved using traditional mechanical means. Because of the inherent functional accuracy limitations, flexibility in operating the aircraft at its optimum airspeed without exceeding safety margins to maximize operational efficiency was hindered.

In most prior art devices, the above functions were provided by complex electronic function generation apparatus or the previously mentioned mechanically selected function generation devices involving either complex mechanisms with limited achievable accuracy or simple mechanisms with limited capability. Additionally, such instruments were not readily adaptable in accordance with the various requirements described above. In some prior art instruments, the maximum allowable airspeed function was implemented by driving the needle through a cam contoured in accordance with one of the desired functions. A second function was implemented by interposing a mechanism to engage the cam follower whereby the cam follower became disengaged from the cam at a particular point on the curve. Thus the second function was constrained to be identical to the first function in the area where the cam follower remained engaged with the cam and to provide a constant airspeed limit value after disengagement. Thus with this arrangement, flexibility and accuracy could not be achieved since the second function was constrained in accordance with the first function and in accordance with the constant value permitted by the mechanism. Additionally, the second function was constrained to provide its constant value at a lower airspeed than the upper airspeed boundary of the first function. In order to achieve flexibility and accuracy with this arrangement, one cam for each function would be required with an exceedingly complicated mechanism for moving the cam follower from one cam to another in order to change functions. In the limited space available in an aircraft flight instrument, this arrangement would be prohibitively bulky ad unreliable. Additionally, since a greater number of mechanical components are involved, the achievable accuracy would be considerably less.

SUMMARY OF THE INVENTION

The present invention eliminates the above-described disadvantages by providing a cam with a plurality of surface segments shaped in accordance with the respective functions. A positioning device, such as a null-seeking electro-mechanical feedback servo mechanism responsive to the independent variable of the functions (altitude in the preferred embodiment), positions the cam so as to drive the indicating needle of the instrument in accordance with one of the functions. An indexing means associated with the positioning device causes the positioning device to assume discrete positions so as to bring the various functional surface segments of the cam into engagement with the cam follower so as to selectively engage the various functions. A selection knob coupled with the indexing means is utilized to select the function.

BRIEF DESCRIPTION OF THE DRAWINGS

FIG. 2 is a schematic block diagram illustrating a preferred embodiment of the invention;

DESCRIPTION OF THE PREFERRED EMBODIMENT

Although the multiple function generation concept of the present invention is applicable to any aspect of flight instrument capabilities, the preferred embodiment will be described in terms of implementing the maximum allowable airspeed functions of an airspeed indicator.

Figure 1A:
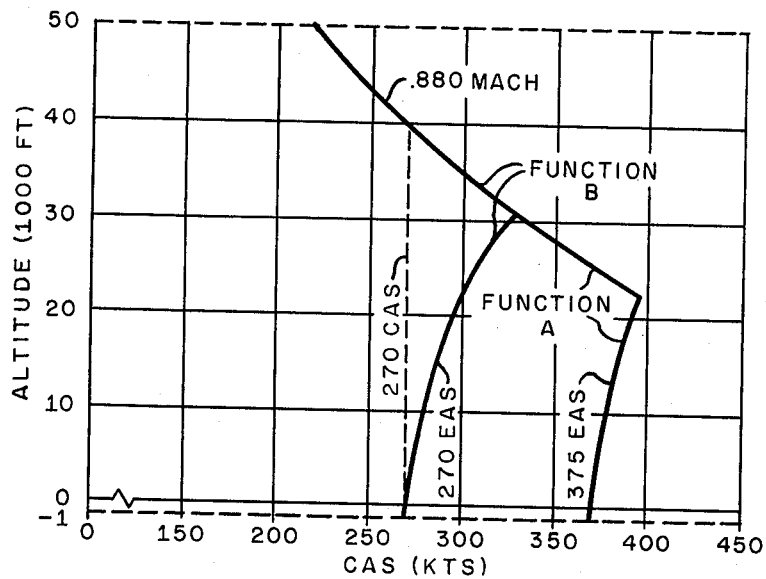
FIGS. 1a, 1b and 1c are function curves of altitude versus calibrated airspeed (CAS) that may be implemented in accordance with the invention.

Referring to FIG. 1a, the dashed line illustrates the practical extent of the prior art capability in implementing a dual $V_{MO}/M_{MO}$ function utilizing mechanical selection. Both functions have a constant mach portion at 0.88M with one of the functions having a linear 375 EAS (Equivalent Airspeed) portion, with the other function having a constant 270 CAS portion. These dashed curves are representative of the capability of the prior art arrangements discussed above and illustrate the inability to change the mach parameter from one function to the other and the limitation to a constant CAS parameter for the second function limited additionally to a lower airspeed than the first function.

The solid line graphs of FIG. 1a illustrate the improved flexibility provided by the present invention. Functions A and B again have a coincident constant mach portion at 0.88M but function A now accurately provides a non-linear 375 EAS portion whereas function B provides an accurate non-linear 270 EAS portion.

Figure 1B:
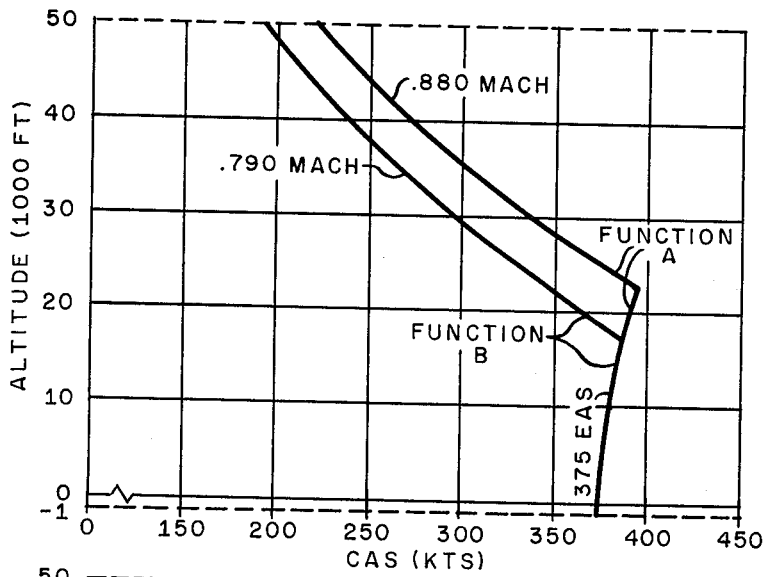

FIG. 1b is a further illustration of the improved flexibility provided by the present invention in that functions A and B have different constant mach portions with a coincident constant EAS portion.

Figure 1C:
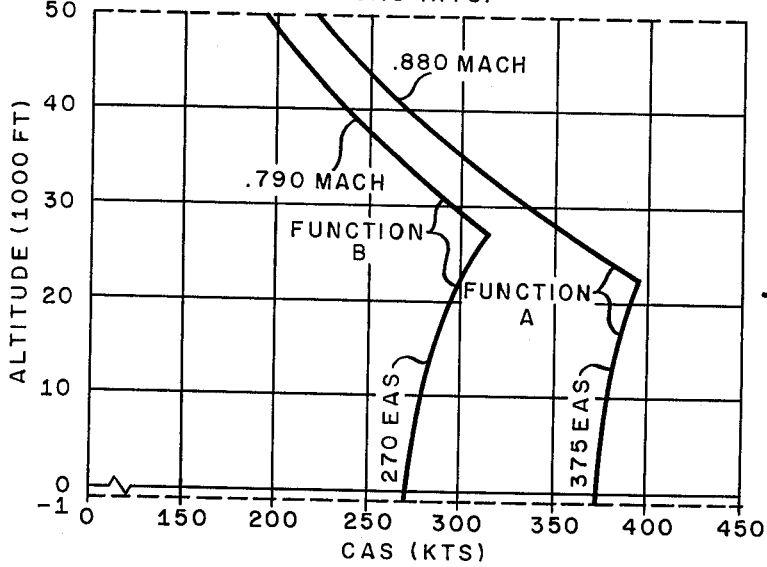

FIG. 1c is a further illustration of the enhanced capability provided by the present invention of generating two fully independent functions.

The maximum allowable airspeed pointer is driven as a function of altitude in accordance with curves such as those illustrated. A selection is made between function A and function B depending upon a plurality of operating conditions such as type of aircraft, aircraft configuration (wheels down, external stores, etc.), aircraft owner's desired operational restrictions, and the like.

Referring now to FIG. 2, an airspeed indicator 10 is illustrated that provides an indication of the calibrated air-speed (CAS) of the aircraft via a needle 11 read against a calibrated airspeed dial 12. The calibrated airspeed needle 11 is driven through a conventional closed loop servo 13 in accordance with the calibrated airspeed data from the aircraft air data computer. The indicator 10 also includes a mach number counter readout 14 which is driven in a conventional manner by a closed loop servo 15 in accordance with the mach number data from the aircraft air data computer.

The airspeed indicator 10 also includes a maximum allowable airspeed ($V_{MO}$) pointer 16 providing an indication to the pilot of the maximum operational airspeed permitted in accordance with aircraft altitude, aircraft configuration, aircraft owner's desired operational restrictions and the like. Thus, the pilot operates the aircraft so that the calibrated airspeed of the craft as indicated by the needle 11 does not exceed the $V_{MO}$ value as indicated by the needle 16.

The maximum allowable airspeed needle 16 is driven through a gear train 17 by a cam mechanism 20. In the illustrated embodiment, the cam mechanism 20 is comprised of a cam 21 and a cam follower 22 coupled to the gear train 17. The cam 21 includes two contoured surfaces A and B disposed on opposite 180° sectors of the cam, the surfaces being shaped in accordance with two functions of maximum allowable airspeed versus altitude designated as functions A and B respectively. Surfaces A and B of the cam 21 may be shaped so as to implement any of the dual functions illustrated in FIGS. 1a, 1b and 1c as well as any other two arbitrary functions. The cam 21 is rotated as a function of altitude by a positioning synchro servomotor loop 23 that receives its input positioning data from the altitude outout of the aircraft air data computer. Thus the $V_{MO}$ needle 16 is positioned by the servo loop 23 in accordance with either function A or function B as a function of altitude.

The three-wire altitude data from the air data computer is applied to a synchro feedback element 24 of the servo loop 23. The synchro 24 may be implemented as either a differential resolver or a control transformer or any other suitable synchro element. The synchro 24 provides the sine and cosine altitude data in a conventional manner with preferably the sine data being applied to a demodulator 25. The output of the demodulator 25 is applied to a servo amplifier 26 whose output is in turn applied through an indexing reversing switch 27 to drive servomotor 30. The output of the servomotor 30 is applied through a gear train 31 to rotate the cam 21 through a suitable coupling 32. The output of the gear train 31 is also applied through suitable coupling 33 to position the rotor of the synchro 24 thereby closing the servo loop 23. When the altitude data applied to the synchro 24 changes, an error signal is applied to the servo amplifier 26 causing the servomotor 30 to reposition the rotor of the synchro 24 until the error signal into the amplifier 26 is reduced to zero. Thus the cam 21 is positioned as a function of altitude. It will be appreciated that the servo loop 23 comprises a null-seeking servo mechanism for positioning the shaft 32.

The indexing reversing switch 27 is coupled through suitable linkage 34 to a selection knob 25 on the airspeed instrument 10. As illustrated, the knob 35 may be positioned to either function A or to function B which in turn activates the reversing switch 27 for reversing the connections to the servomotor 30. Since the servo loop 23 is a null-seeking servo mechanism, the two positions of the switch 27 effect a servo null index change of 180°. Thus, when the knob 35 is rotated from one position to the other, the null of the servo loop 23 is changed by 180° causing the servomotor to seek the new null, repositioning the cam 21 through 180° C. Since the functions A and B are disposed on opposite 180° sectors of the cam 21, rotating the knob 35 from one position to the other changes the effective function from one to the other.

The range of altitude data required for positioning the limit pointer 16 of the airspeed indicator 10 is only a fraction of the range of data supplied by typical aircraft air data computers meeting ARINC standards. For example, in accordance with particular ARINC standards (air data computer standards) the scale factor for the altitude data is 135,000 feet per revolution of a standard synchro data transmitter such as the synchro 24 while typically the range of altitude for maximum allowable airspeed indication does not exceed an altitude range of 51,000 feet ($-1,000$ to $+50,000$) and therefore the 51,000 foot range for maximum allowable airspeed indication is less than 180° of synchro rotation. Thus the cam 21 driven by the motor 30 at a one-to-one ratio in response to the output of the altitude synchro 24 is used to provide the two independent functions A and B. Utilizing the charge in servo index as a result of reversing the connections via the switch 27, the two functions are selectively rendered effective.

Figure 3:
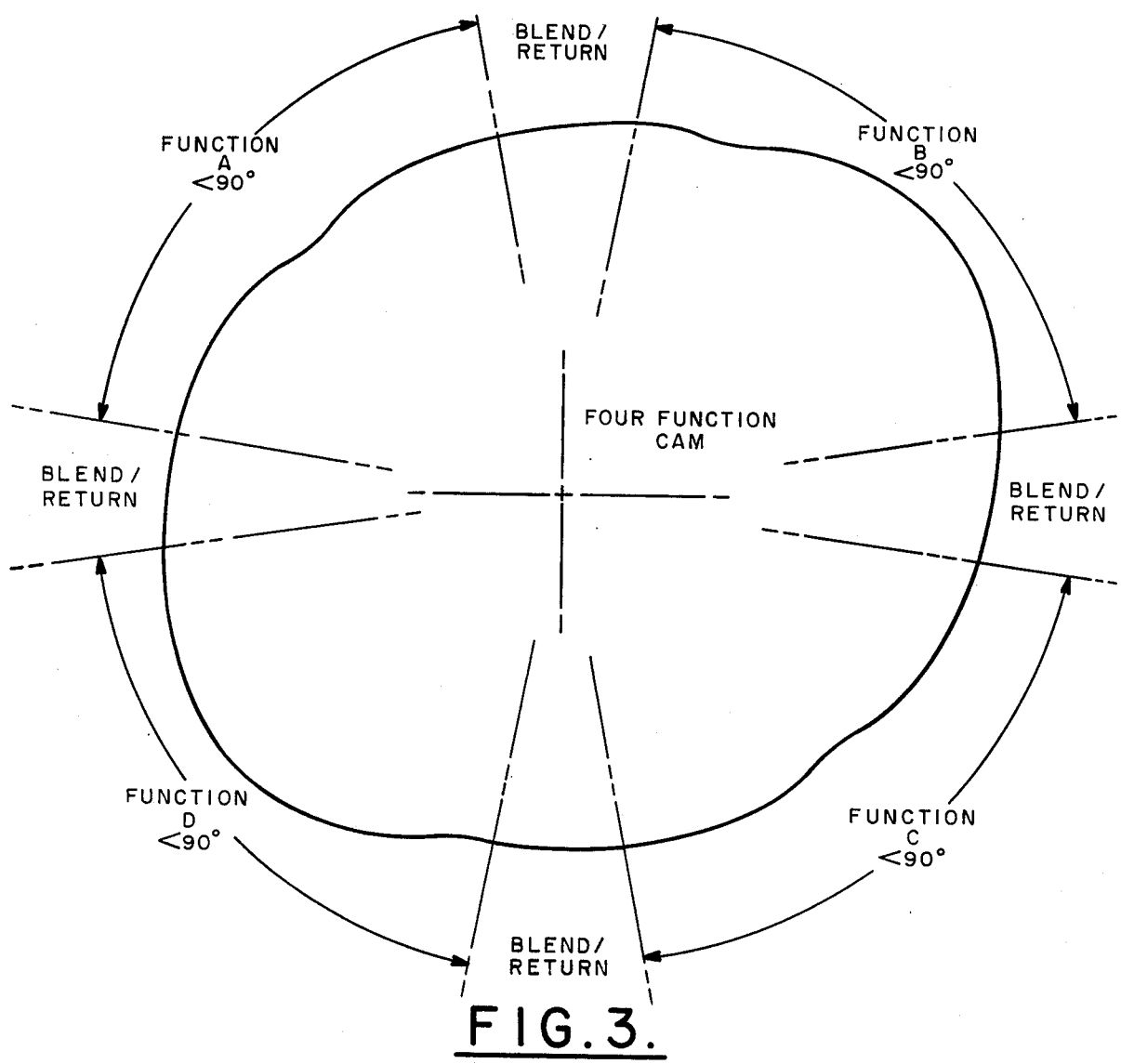
FIG. 3 is a plan elevation view of a cam implementing four functions in accordance with the invention.

In the above described embodiment, the two-position knob 35 effected the proper connections via the switch 27 to result in a servo null index change of 180°. Similarly, up to 12 functions may be implemented and selected where the full range electrical angle of the input data required for each function does not exceed 360° divided by the number of functions desired, an appropriate synchro type being used with appropriate servo index changes being introduced. For example, FIG. 3 illustrates a four-function cam where each functional contour requires less than 90° of cam rotation.

Figure 4:
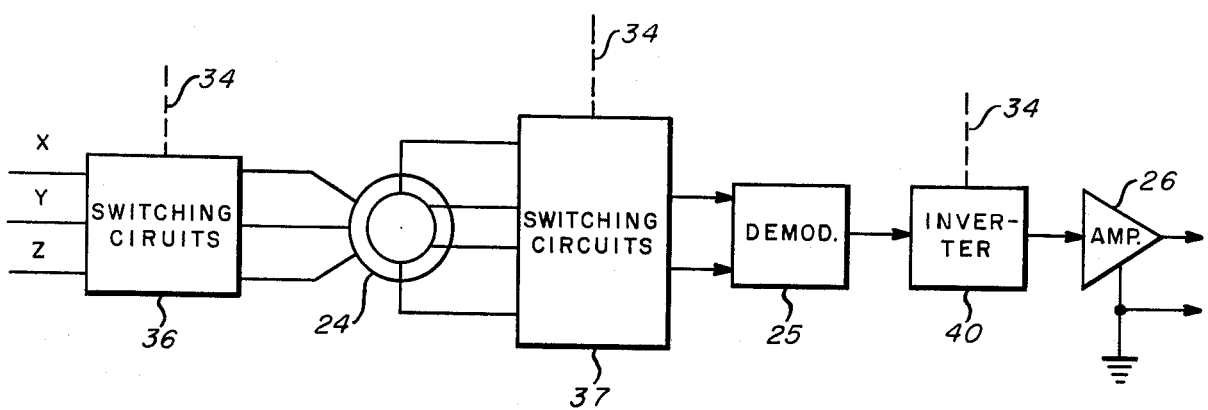
FIG. 4 is a schematic block diagram illustrating alternative embodiments of the indexing device.

Referring now to FIG. 4, where like reference numerals indicate like components, with respect to FIG. 2, alternative index changing apparatus is illustrated. Utilizing a switching circuit 36 at the input to the synchro 24 can effect index changes of 120°. For example by reversing the Y and Z leads such an index change is accomplished. A switching circuit 37 at the output of the synchro 24 may be utilized to effect null index changes of 90°, for example by interchanging the sine and cosine leads. As an alternative arrangement in implementing a 180° index change, an inverter 40 may be utilized at the input to the amplifier 26. The blocks 36, 37 and 40 may be used individually or in combination and may be actuated by an appropriate selection mechanism or circuit via suitable linkages or circuitry 34. By utilizing combinations of 90°, 120° and 180°, index changes in increments of 30° may be effected in implementing up to 12 independent functional contours.

With the indications provided by the instrument 10 of FIG. 2, the aircraft is flying at 0.683 Mach and 285 knots CAS with the $V_{MO}$ limit switch at A. The indicated $V_{MO}$ is 375 knots CAS which corresponds to a 0.880 M limit. At this altitude, the pilot may increase his airspeed to 375 knots CAS (0.880 Mach) without exceeding the $V_{MO}$ limit.

It is appreciated from the foregoing, that a plurality of precision functions may be implemented utilizing the index and rotation reference flexibility characteristics of a null-seeking servo mechanism with a synchro feedback element to position the cam according to selected electrical connection parameters to produce more than one non-linear mechanical output shaft angle function with a single cam. The invention utilizes a simple cam and follower arm mechanism, simple and reliable function selection via switching of electrical signals and provides excellent accuracy since common function generation and positioning elements are used for all of the functions. Thus, the $V_{MO}$ pointer may be positioned in accordance with multiple and selectable functions of aircraft altitude depending upon a plurality of operating conditions such as type of aircraft, aircraft configuration (wheels down, external stores, etc.), aircraft owner's desired operational restrictions and the like. The present invention computes and displays precision maximum airspeed limits which permits the pilot to operate the aircraft at its optimum airspeed without exceeding safety margins, thereby allowing more flexibility in maximizing the operational efficiency thereof.

Some airlines may utilize the precision and flexibility of the present invention by employing one curve for normal operation and a second curve for special flights. For example, a special flight may be where the landing gear must remain extended or where external stores are to be transported, e.g. a space engine, and where maximum speeds must be kept at a low value. The present invention permits generating the special $V_{MO}/M_{MO}$ curve below a specified altitude without encountering any sharp rises in the "normal" cam surface. The present invention provides a means of generating more than one mechanical output shaft angle function selectable by switching electrical signals with a minimum of function generation hardware.

The present invention may facilitate adapting flight instruments to a wide variety of aircraft users requirements. The desired functional contours may readily be introduced into the instrument merely by changing the cam 21 to one contoured to provide the required functions and providing the appropriate switching capability.

Although the above-described embodiment of the invention was illustrated in terms of utilizing a null-seeking servo with index changing arrangements, it will be appreciated that other indexable positioning mechanisms may be utilized to the same effect. It will furthermore be appreciated that although described in terms of the $V_{MO}$ function, the concepts of the invention may be utilized for selectable multi-function generation for other purposes in flight instruments. It will furthermore be appreciated that although the function selection knob was illustrated located on the instrument, other selection means may be utilized at other locations, for example an electrical switch mounted on the instrument panel or variations in indicator connector pin assignments.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. In an aircraft flight instrument having an indicator positionable in accordance with a plurality of selectable functions of an input variable, comprising
    cam means coupled with said indicator and having a plurality of surfaces shaped in accordance with said functions, respectively,
    positioning means responsive to said input variable and coupled with said cam means for positioning said cam means in accordance with said input variable thereby positioning said indicator in accordance with a selected one of said functions,
    indexing means coupled with said positioning means for selectively positioning said positioning means to a plurality of discrete positions corresponding to said plurality of surfaces respectively for selectively positioning said cam means to selectively render effective said functions, and selection means coupled with said indexing means for selecting said function.

2. In the aircraft flight instrument of claim 1 in which said positioning means comprises servo loop means including servo motor means responsive to said input variable for positioning said cam means in accordance therewith.

3. In the aircraft flight instrument of claim 2 in which said servo loop means includes input synchro means responsive to said input variable for providing the servo loop error signal to said servo motor means.

4. In the aircraft flight instrument of claim 3 in which
    said servo loop means comprises a null-seeking servo mechanism, and
    said indexing means comprises means for electrically changing the null of said servo mechanism.

5. In the aircraft flight instrument of claim 3 in which said indexing means comprises means for reversing the polarity of said error signal with respect to said servo motor means for changing the position of the servo null thereby positioning said cam from one said function to another.

6. In the aircraft flight instrument of claim 3 in which said indexing means comprises means for switching the input leads of said synchro means with respect to each other for repositioning the null of said servo loop means thereby positioning said cam means from one said function to another.

7. In the aircraft flight instrument of claim 3 in which said indexing means comprises means for switching the output leads of said synchro means with respect to each other for repositioning the null of said servo loop means thereby positioning said cam means from one said function to another.

8. In the aircraft flight instrument of claim 5 in which said selection means comprises manually operable means coupled to said reversing means for actuating said reversing means to change said null of said servo loop means.

9. In the aircraft flight instrument of claim 6 in which said selection means comprises manually operable means coupled to said switching means for actuating said switching means to change said null of said servo loop means.

10. In the aircraft flight instrument of claim 2 in which said cam means comprises
- a cam coupled to be rotated by said servomotor means in response to said input variable, and
- cam follower means coupled to said indicator for following said cam surfaces shaped in accordance with said functions.

11. In the aircraft flight instrument of claim 1, in which
- said instrument comprises an airspeed indicating instrument,
- said indicator comprises a maximum airspeed needle,
- said functions comprise functional relationships between maximum allowable airspeed and altitude, and
- said input variable comprises altitude.

* * * * *